United States Patent
Connor et al.

(10) Patent No.: US 10,289,122 B2
(45) Date of Patent: May 14, 2019

(54) COMMUNICATION LINK ACCESSIBILITY AWARE NAVIGATION

(71) Applicant: SIKORSKY AIRCRAFT CORPORATION, Stratford, CT (US)

(72) Inventors: Michael Aaron Connor, Bridgeport, CT (US); George Nicholas Loussides, Branford, CT (US); Harshad S. Sane, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1 day.

(21) Appl. No.: 15/519,024

(22) PCT Filed: Oct. 27, 2015

(86) PCT No.: PCT/US2015/057576
§ 371 (c)(1),
(2) Date: Apr. 13, 2017

(87) PCT Pub. No.: WO2016/069598
PCT Pub. Date: May 6, 2016

(65) Prior Publication Data
US 2017/0229023 A1    Aug. 10, 2017

Related U.S. Application Data

(60) Provisional application No. 62/068,903, filed on Oct. 27, 2014.

(51) Int. Cl.
G05D 1/10       (2006.01)
H04W 84/18      (2009.01)
(Continued)

(52) U.S. Cl.
CPC ........... G05D 1/104 (2013.01); B64C 39/024 (2013.01); G08G 5/006 (2013.01); G08G 5/0008 (2013.01);
(Continued)

(58) Field of Classification Search
CPC ........ G05D 1/104; G01C 21/00; G01C 21/20; G01C 21/3453; G01C 21/3461;
(Continued)

(56) References Cited

U.S. PATENT DOCUMENTS 5,850,617 A    12/1998   Libby
7,480,866 B2   1/2009    Germain et al.
(Continued)

FOREIGN PATENT DOCUMENTS

WO   WO-2010055602 A1 *  5/2010  ............ H04W 84/18

OTHER PUBLICATIONS

Esposito, Joel M., "Maintaining Wireless Connectivity Constraints for Robot Swarms in the Presence of Obstacles", Journal of Robotics, 2011, 12 pages (Year: 2011).*
(Continued)

*Primary Examiner* — Behrang Badii
*Assistant Examiner* — David A Testardi
(74) *Attorney, Agent, or Firm* — Cantor Colburn LLP

(57) ABSTRACT

A method of communication link accessibility aware navigation is provided that includes querying a communication link accessibility map based on a location of interest provided by a path planner for a communication node. A communication link accessibility indicator is received representing a communication link characteristic associated with the location of interest in response to querying the communication link accessibility map. A communication link accessibility weight is determined based on a mission priority of maintaining a communication link of the com-
(Continued)

munication node. The communication link accessibility weight is applied to the communication link accessibility indicator.

13 Claims, 6 Drawing Sheets

(51) Int. Cl.
| | |
|---|---|
| H04W 84/00 | (2009.01) |
| B64C 39/02 | (2006.01) |
| G08G 5/00 | (2006.01) |
| H04W 4/029 | (2018.01) |
| G08G 5/04 | (2006.01) |
| H04L 12/26 | (2006.01) |
| H04W 24/08 | (2009.01) |

(52) U.S. Cl.
CPC ......... *G08G 5/0034* (2013.01); *G08G 5/0039* (2013.01); *G08G 5/0052* (2013.01); *G08G 5/0069* (2013.01); *G08G 5/0086* (2013.01); *G08G 5/045* (2013.01); *H04L 43/045* (2013.01); *H04L 43/0811* (2013.01); *H04W 4/029* (2018.02); *H04W 24/08* (2013.01); *H04W 84/005* (2013.01); *H04W 84/18* (2013.01); *B64C 2201/122* (2013.01)

(58) Field of Classification Search
CPC ..... H04W 16/00; H04W 24/02; H04W 84/06; H04W 84/18; H04W 84/005; B64C 2201/122; H04B 7/18502; H04B 7/18504; H04B 7/18506; G08G 5/008
See application file for complete search history.

(56) References Cited

U.S. PATENT DOCUMENTS

| | | | | |
|---|---|---|---|---|
| 8,194,573 B1* | 6/2012 | Smith | .............. | H04W 8/005 370/255 |
| 8,494,689 B1* | 7/2013 | Ashton | .............. | G05D 1/104 318/135 |
| 8,781,727 B1* | 7/2014 | Bonawitz | .............. | G05D 1/104 701/410 |
| 8,879,426 B1* | 11/2014 | Quilling | .............. | H04W 40/20 370/255 |
| 9,131,529 B1* | 9/2015 | Ayyagari | .............. | H04W 84/06 |
| 9,137,847 B1* | 9/2015 | Ayyagari | .............. | H04W 84/18 |
| 2003/0202468 A1* | 10/2003 | Cain | .............. | H04L 45/00 370/229 |
| 2004/0030451 A1* | 2/2004 | Solomon | .............. | B64C 39/024 700/245 |
| 2004/0058652 A1 | 3/2004 | McGregor et al. | | |
| 2005/0114551 A1* | 5/2005 | Basu | .............. | G01S 5/0289 709/249 |
| 2006/0211413 A1* | 9/2006 | Ariyur | .............. | H04W 16/18 455/423 |
| 2006/0235610 A1* | 10/2006 | Ariyur | .............. | G01C 21/005 701/533 |
| 2007/0168090 A1* | 7/2007 | DeMarco | .............. | G05D 1/104 701/23 |
| 2007/0253341 A1* | 11/2007 | Atkinson | .............. | H04L 45/02 370/252 |
| 2007/0299794 A1* | 12/2007 | El-Damhougy | .... | H04W 40/246 706/15 |
| 2007/0299946 A1* | 12/2007 | El-Damhougy | .... | H04L 43/0811 709/223 |
| 2007/0299947 A1* | 12/2007 | El-Damhougy | .... | H04W 76/028 709/223 |
| 2010/0163914 A1 | 7/2010 | Urano | | |
| 2010/0195520 A1 | 8/2010 | Nakamura | | |
| 2011/0163914 A1* | 7/2011 | Seymour | .............. | G01S 19/05 342/357.42 |
| 2011/0267982 A1* | 11/2011 | Zhang | .............. | H04B 7/2606 370/256 |
| 2012/0059578 A1 | 3/2012 | Venkatraman | | |
| 2012/0095651 A1* | 4/2012 | Anderson | .............. | G05D 1/0274 701/50 |
| 2013/0238170 A1* | 9/2013 | Klinger | .............. | G05D 1/104 701/3 |
| 2013/0332075 A1* | 12/2013 | Wang | .............. | G01C 21/3453 701/527 |
| 2014/0010069 A1* | 1/2014 | Abbasi | .............. | H04W 40/248 370/221 |
| 2014/0081505 A1* | 3/2014 | Klinger | .............. | G08G 1/162 701/25 |
| 2014/0325257 A1* | 10/2014 | Alfadhly | .............. | G06F 11/2002 714/4.11 |
| 2015/0334768 A1* | 11/2015 | Ranasinghe | .......... | H04W 24/10 370/328 |
| 2017/0111767 A1* | 4/2017 | Xie | .............. | G01S 5/0284 |
| 2018/0218734 A1 | 8/2018 | Somech et al. | | |
| 2018/0302838 A1 | 10/2018 | Loussides | | |

OTHER PUBLICATIONS

Pereira, Guilherme A. S., et al., "Decentralized motion planning for multiple robots subject to sensing and communication constraints" (2003), Departmental Papers (MEAM), 45, 14 pages, http://repository.upenn.edu/meam_papers/45 (Year: 2003).*

Tanil, Cagatay et al., "Collaborative Mission Planning for UAV Cluster to Optimize Relay Distance", 2013 IEEE Aerospace Conference, Big Sky, MT, 2013, pp. 1-11 (Year: 2013).*

Co-Optimization of Communication and Motion Planning of a Robotic Operation in Fading Environments; Written by: Yan, Yuan and Mostofi, Yasamin; ECE Department, University of New Mexico, Albuquerque, NM 87113; Link: http://www.ece.ucsb.edu/~ymostofi/papers/Asilomar11.pdf, (Year: 2011).

Notification of Transmittal of the International Search Report for Application No. PCT/US2015/057576 dated Dec. 21, 2015; Mailed Jan. 21, 2016; 7 pages.

Written Opinion of the International Searching Authority for Application No. PCT/US2015/057576 dated Dec. 21, 2015; Mailed Jan. 21, 2016; 5 pages.

* cited by examiner

COMMUNICATION LINK ACCESSIBILITY AWARE NAVIGATION

CROSS REFERENCE TO RELATED APPLICATIONS

This application is a National Stage application of PCT/US2015/057576, filed Oct. 27, 2015, which claims the benefit of U.S. Provisional Application No. 62/068,903, filed Oct. 27, 2014, both of which are incorporated by reference in their entirety herein.

BACKGROUND OF THE INVENTION

The subject matter disclosed herein generally relates to communication systems, and more particularly to communication link accessibility aware navigation.

Communication systems that include mobile communication nodes can experience reduced performance and/or signal loss as one or more of the mobile communication nodes change position. Environmental factors and repositioning of obstacles that impair communication can also result in reduced communication system performance. Communication link accessibility between communication nodes may require a clear line of sight for optical or high-bandwidth communication. When one or more of the communication nodes are unmanned aerial vehicles (UAVs), a reduction or loss in communications can impede decision-making and planning capabilities. Maintaining communication between communication nodes, as well as predicting locations of reduced communication system performance can be challenging, especially in areas of heavy terrain or among urban canyons. Terrain maps can be useful in making navigation decisions, but they may not accurately reflect a wide range of impediments to communication system performance or current conditions of the area covered by the terrain maps.

BRIEF DESCRIPTION OF THE INVENTION

According to an aspect of the invention, a method of communication link accessibility aware navigation is provided that includes querying a communication link accessibility map based on a location of interest provided by a path planner for a communication node. A communication link accessibility indicator is received representing a communication link characteristic associated with the location of interest in response to querying the communication link accessibility map. A communication link accessibility weight is determined based on a mission priority of maintaining a communication link of the communication node. The communication link accessibility weight is applied to the communication link accessibility indicator.

In addition to one or more of the features described above or below, or as an alternative, further embodiments could include monitoring signal data of one or more communication links at the communication node with respect to the communication node and one or more communication nodes, populating the communication link accessibility map with classifications of the one or more communication links as communication link accessibility indicators, and updating the communication link accessibility map based on a change of position of the communication node or a change detected in a characteristic of at least one of the one or more communication links.

In addition to one or more of the features described above or below, or as an alternative, further embodiments could include where applying the communication link accessibility weight to the communication link accessibility indicator is performed in combination with a mission model to update a path plan of the communication node. A trajectory to navigate the communication node from a current position based on the update of the path plan can be determined. One or more remote path plans from the one or more communication nodes can be received. A change in position of at least one of the one or more communication nodes can be predicted based on the one or more remote path plans, one or more known obstacle locations, and present or past values of communication link accessibility data from the communication link accessibility map.

In addition to one or more of the features described above or below, or as an alternative, further embodiments could include adjusting the trajectory to navigate the communication node based on the change in position predicted for at least one of the one or more communication nodes.

In addition to one or more of the features described above or below, or as an alternative, further embodiments could include sharing the path plan, the current position, and the trajectory of the communication node with the one or more communication nodes. A modification of the path plan can be cooperatively determined with the one or more communication nodes to maintain or restore the one or more communication links.

In addition to one or more of the features described above or below, or as an alternative, further embodiments could include generating communication link accessibility estimates for a present state and a future state of the communication node based on the path plan, the current position, the trajectory of the communication node, one or more known obstacle locations, and present or past values of communication link accessibility data from the communication link accessibility map. Communication link accessibility estimates can be shared for the present state and the future state of the communication node with the one or more communication nodes.

In addition to one or more of the features described above or below, or as an alternative, further embodiments could include where the communication link accessibility map further includes a time stamp for each update of the communication link accessibility map.

In addition to one or more of the features described above or below, or as an alternative, further embodiments could include merging the communication link accessibility map with data from one or more maps received from one or more remote source.

In addition to one or more of the features described above or below, or as an alternative, further embodiments could include monitoring for a communication link loss at the communication node, and providing a list to the path planner of one or more known positions where at least one communication link was previously established to assist in modifying the path plan to restore communication.

In addition to one or more of the features described above or below, or as an alternative, further embodiments could include where the communication node is an unmanned aerial vehicle.

According to further aspects of the invention, a communication node for communication link accessibility aware navigation is provided. The communication node includes a processor and memory having instructions stored thereon that, when executed by the processor, cause the communication node to query a communication link accessibility map based on a location of interest provided by a path planner for the communication node. A communication link accessibility indicator is received representing a communication link characteristic associated with the location of interest in response to the query of the communication link accessibility map. A communication link accessibility weight is determined based on a mission priority of maintaining a communication link of the communication node. The communication link accessibility weight is applied to the communication link accessibility indicator.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
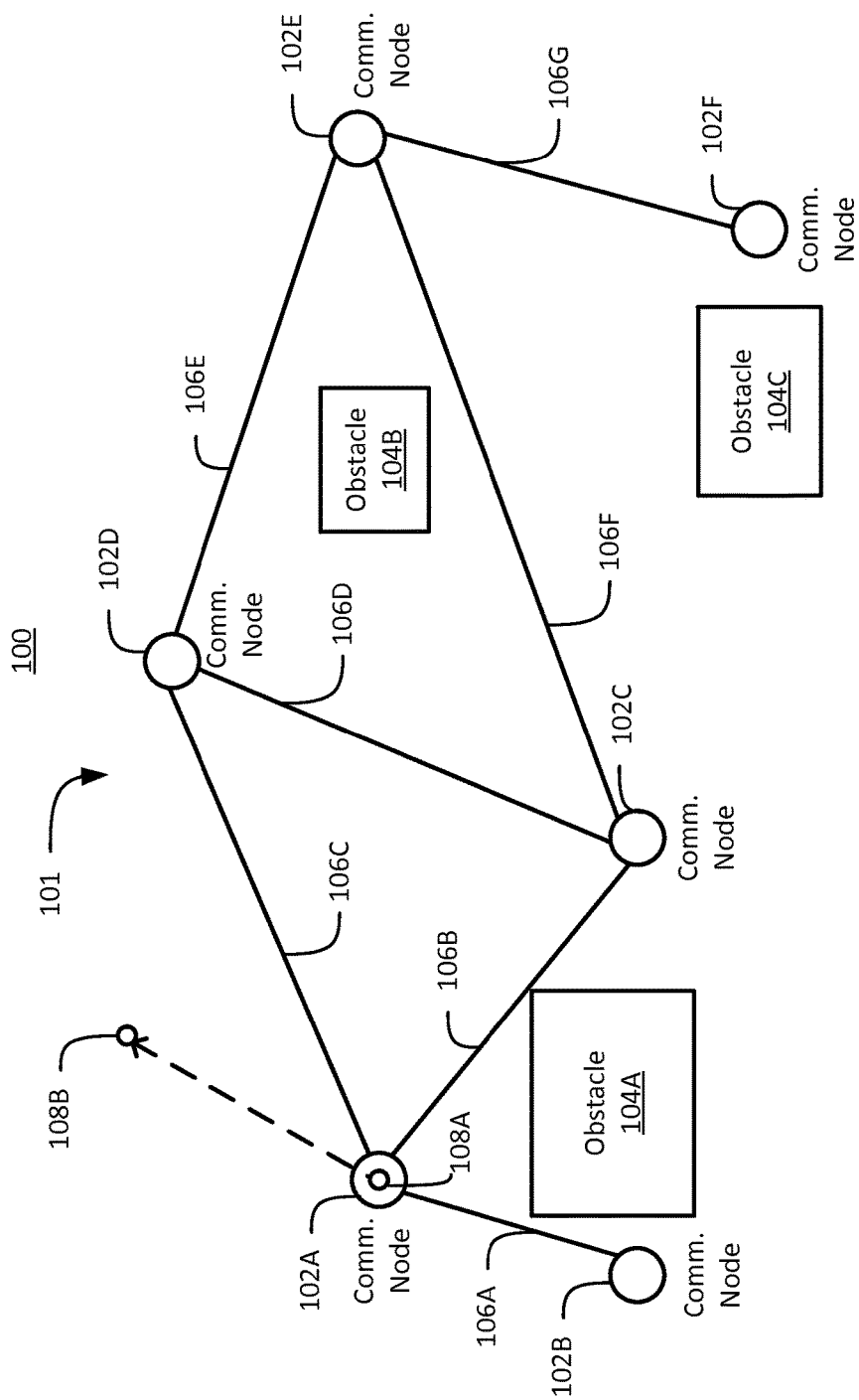
FIG. 1 schematically depicts a group of communication nodes in accordance with an embodiment.

In exemplary embodiments, a cooperative system of communication nodes supports communication link accessibility aware navigation by using a communication link accessibility map relative to one or more communication nodes in a navigation and path planning process. A communication node is an apparatus that includes a communication interface that receives a communication link from at least one other communication node. A communication link can be unidirectional or bidirectional. For example, a communication link can support two-way communication between a pair of communication nodes. Alternatively, a communication node may listen to communication broadcast by another communication node, such as listening to a radio or radar signal broadcast by another communication node. Communication nodes can be statically positioned or mobile. For instance, a communication node can be embodied in air, ground, and underwater vehicles, fixed ground stations, and portable communication systems (including cell phones & handheld radios). Communication nodes of various types can interact with each other, such as an unmanned aerial vehicle (UAV) establishing a communication link with one or more ground stations.

In an exemplary embodiment, in order to navigate a mobile instance of a communication node, a path planner considers communication link accessibility in path planning decisions. A weight can be applied to a communication link accessibility indicator representing a communication link characteristic associated with a location of interest along a path under consideration, where the weight represents a relative priority of maintaining a communication link with respect to other cost/risk factors considered in path planning decisions. For instance, avoidance of obstacles and known threats may be given a highest weight, a most direct path may be given a lower weight, and maintaining a communication link can be given a lowest weight. In considering two possible paths that both avoid obstacles and involve a similar distance, a path that is estimated to have better communication link accessibility can be chosen over a path that is estimated to have lower communication link accessibility. If, however, the paths that avoid obstacles have a large difference in distances traveled to reach a same target destination, the higher weighting on selecting a most direct path can result in the more direct path being selected even though it may exhibit lower communication link accessibility. As an alternate example, communication link accessibility may have a higher weighting than selecting a most direct path for communication critical applications.

A communication link accessibility map can store communication link accessibility indicators associated with multiple locations. The communication link accessibility map can be provided to one or more communication nodes from a remote source and/or populated/updated by one or more communication nodes. As one example, a communication node can be provided with a baseline instance of a communication link accessibility map that defines communication link characteristics of fixed position communication nodes. The communication node can then further populate and update the communication link accessibility map as other communication nodes are discovered, as the communication node changes positions (e.g., including a change in location and/or orientation) or as observed characteristics of communication links change over time (e.g., reduced or increased noise, reduced or increased signal strength, etc.).

In one embodiment, repeated comparisons are performed of characteristics of currently received signal data of a communication link at a position of a communication node against one or more maps, where the position can be an index into the one or more maps. Characteristics of the signal data are identified, and a location stamp of the position of the communication node is applied. The communication link can be classified based on the characteristics of the signal data to define a signal quality level based on one or more threshold comparisons or weightings of the characteristics to classify the communication link as, for example, high quality (e.g., sufficiently high signal-to-noise ratio, low error rate), low quality (e.g., low signal-to-noise ratio, high error rate), or acceptable quality (e.g., mid-level values sufficient to achieve a reliable signal). Classification can also be performed on relative signal strength or other characteristics. Classifications may be defined with different levels of granularity depending upon system processing capabilities and precision needs. Tracking of signal trends can be performed over time and based on position changes.

Each communication node that supports communication link accessibility aware navigation can develop localized maps based on signal data for all observed links and exchange maps with other communication nodes to develop a more robust communication link accessibility map covering multiple communication links and positions. Communication nodes can also exchange position information, trajectory information, and path plans, as well as communication link accessibility estimates for a present state and a future state of respective communication nodes. Exchanging of information can enable cooperative path planning between multiple communication nodes. Communication nodes may also perform communication link loss monitoring to assist in modifying a path plan to restore communication based on detecting a loss of communication. Upon a loss of communication, a communication node may attempt to return to a known position where at least one communication link was previously established by the communication node or by another communication node which previously shared its communication link accessibility map.

FIG. 1 schematically depicts a configuration 100 of a group 101 of communication nodes 102 in accordance with an embodiment. In the example of FIG. 1, a communication node 102A receives signal data directly from communication nodes 102B, 102C, and 102D. A number of obstacles that degrade or prevent communication may be present. Obstacles can include any physical objects that may obstruct communication between communication nodes 102, such as terrain or man-made objects that have their locations and dimensions documented within a map. Obstacle data in a map may be updated dynamically as new obstacles are discovered and/or characteristics of previously identified obstacles change. The communication nodes 102 can use information about their relative positioning with respect to the locations of obstacles in order to predict likely communication link obstructions for possible future states. For example, in FIG. 1, obstacle 104A prevents direct communication between communication nodes 102B and 102C. Similarly, obstacle 104B prevents a communication link between communication nodes 102A and 102E. Obstacle 104C prevents a communication link between communication nodes 102A and 102F. The obstacles 104A, 104B, and 104C need not be physical obstacles but can be any impediment to communication, such as an area of high electromagnetic interference. In the example of FIG. 1, communication node 102A receives signal data from communication node 102B on communication link 106A, receives signal data from communication node 102C on communication link 106B, and receives signal data from communication node 102D on communication link 106C. A communication link 106D can be established between communication nodes 102C and 102D. In the first configuration 100, communication node 102E has a communication link 106E with respect to communication node 102D, communication link 106F with respect to communication node 102C, and communication link 106G with respect to communication node 102F.

At position 108A, communication node 102A monitors signal data of communication links 106A, 106B, and 106C. The communication node 102A can identify a number of characteristics, such as data rate, bit error rate, signal strength, noise level, and/or signal-to-noise ratio for signal data on the each of the communication links 106A, 106B, and 106C. The communication node 102A can also track communication frequencies, modes, and directional information relative to each of the communication links 106A, 106B, and 106C. A location stamp of the position 108A can be applied to the characteristics of the signal data for each of the communication links 106A, 106B, and 106C. Based on the expected communication characteristics for each of the communication links 106A, 106B, and 106C, the determined characteristics can be used to classify communication link quality of each of the communication links 106A, 106B, and 106C at position 108A. A time stamp can also be applied to form a vector of multiple iterations of characterization and classification at position 108A over a period of time. Communication node 102A can populate a map classifying the communication links 106A, 106B, and 106C at the position 108A, which can be indicated by a location stamp. Updates to the map can be made based on a change in position of the communication node 102A and/or a detected change in at least one of the characteristics of the communication links 106A, 106B, and 106C. A hysteresis band may be applied for change detection such that relatively small changes (e.g., <10%) do not trigger a map update.

For each of the communication nodes 102B-102F that supports communication link accessibility aware navigation, similar maps can be developed for respective communication links and positions as described in reference to communication node 102A. The communication nodes 102A-102F can exchange maps with neighboring communication nodes such that each of the communication nodes 102A-102F may develop a communication link accessibility map that incorporates extended map data. For example, communication node 102D can receive a map from communication node 102E to learn about accessibility to communication node 102F associated with communication link 106G. Communication node 102A can learn about accessing communication node 102F from communication node 102D based on map data provided by communication node 102E. Communication node 102A can also learn about accessing communication node 102F from communication node 102C based on map data provided by communication node 102E. Communication node 102A need not be aware of the existence of obstacles 104A-104C nor the precise boundaries of obstacles 104A-104C; however, the communication node 102A can use direction information and position information from its local maps and received maps to determine where communication with other communication nodes may be improved or diminished. The received maps can also be used to communication routing decisions, such as selecting a preferred communication path for sending messages from communication node 102A to communication nodes 102E or 102F.

Instances of the communication nodes 102A-102F that are mobile can also exchange path plans, current position, and trajectory information. Communication link accessibility maps developed by the communication nodes 102A-102F can include present state values and estimates of future states based on anticipated movements of mobile instances of the communication nodes 102A-102F. The communication nodes 102A-102F can coordinate movements with each other to maintain communication links with each other.

Figure 2A:
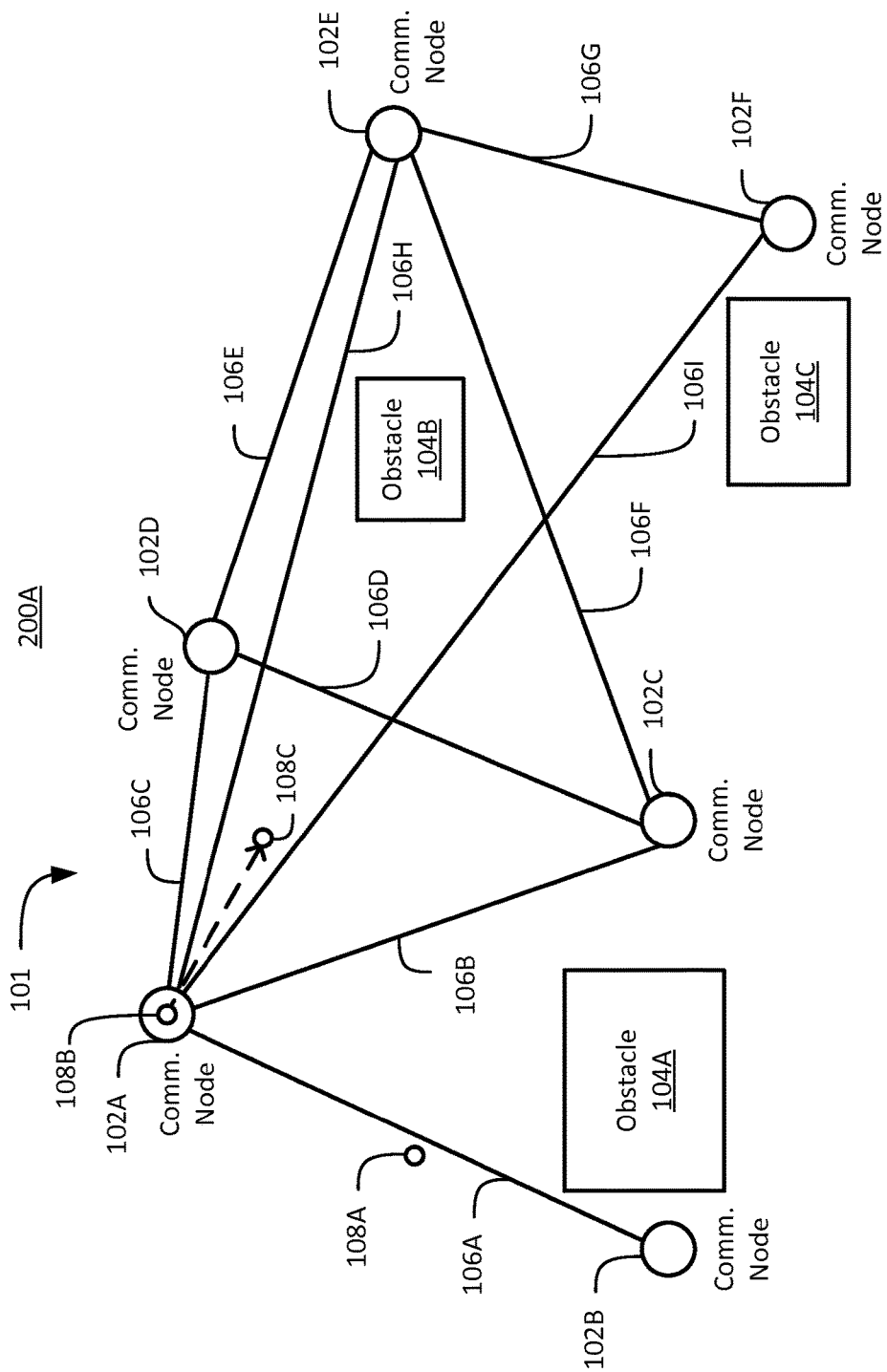
FIG. 2A schematically depicts a first position shift of the group of communication nodes of FIG. 1 in accordance with an embodiment.

In one embodiment, communication node 102A is mobile and moves to various positions to further develop a communication link accessibility map. For instance, communication node 102A can move to position 108B, as further described in reference to FIG. 2A. FIG. 2A schematically depicts a first position shift 200A of the group 101 of communication nodes 102 after communication node 102A shifts positions from position 108A to position 108B in accordance with an embodiment. Upon moving from position 108A to position 108B, communication node 102A may discover changes in characteristics of signal data received on communication links 106A, 106B, and 106C. For instance, an increased distance of communication links 106A and 106B may result in reduced signal quality characteristics, and a decreased distance of communication link 106C can result in improved signal quality characteristics. Thus, communication node 102A may classify communication link 106C as a higher quality communication link than communication link 106B, and select a communication path including communication links 106C and 106E rather than communication links 106B and 106F if attempting to communicate with communication node 102E indirectly. At position 108B, communication node 102A may also discover that a communication link 106H can be established directly with respect to communication node 102E, and a communication link 106I can be established directly with respect to communication node 102F.

Communication node 102A can compare the characteristics of the signal data at positions 108A and 108B over a period of time. Classification of each of the communication links 106A-106C, 106H and 106I can be based on a gradient of the characteristics of signal data at each of the positions 108A and 108B and/or between the positions 108A and 108B over a period of time. Gradient calculations can define a signal quality improvement, a signal quality reduction, or a signal quality rate of change. For example, signal quality of communication link 106A may change while the communication node 102A remains at position 108B, e.g., if communication node 102B moves behind obstacle 104A. A gradient of characteristics of signal data between the positions 108A and 108B can indicate improved or reduced signal quality per communication link. For instance, moving communication node 102A from position 108B back to position 108A results in a loss of communication link 106H due to obstacle 104B and a loss of communication link 106I due to obstacle 104C. Trend and gradient information can also be exchanged between communication nodes 102A-102F.

In order to shorten distances of communication links 106B, 106C, 106H, and 106I, a path planner of communication node 102A may select position 108C as a location of interest and query a communication link accessibility map to determine one or more communication link accessibility indicators of position 108C. If communication node 102A has not previously been at position 108C, the communication node 102A can use data received from communication nodes 102C-102F to establish an estimated future state of communication links 106B, 106C, 106H, and 106I by navigating to position 108C. For instance, the communication node 102A can discover that communication link 106E is stronger than communication link 106H, thus moving toward communication nodes 102D and 102E may increase the strength of communication link 106H. The communication node 102A can also learn that communication link 106G is stronger than communication link 106I, thus moving toward to communication nodes 102E and 102F may increase the strength of communication link 106I. The communication node 102A can also determine that moving closer to communication nodes 102C and 102D should increase the signal strength of communication links 106B and 106C. However, the communication node 102A may not be fully aware of the potential impact of obstacle 104A on communication link 106A upon moving to position 108C. Therefore, the communication node 102A may determine a trajectory to navigate directly from a current position of 108B to new position 108C.

Figure 2B:
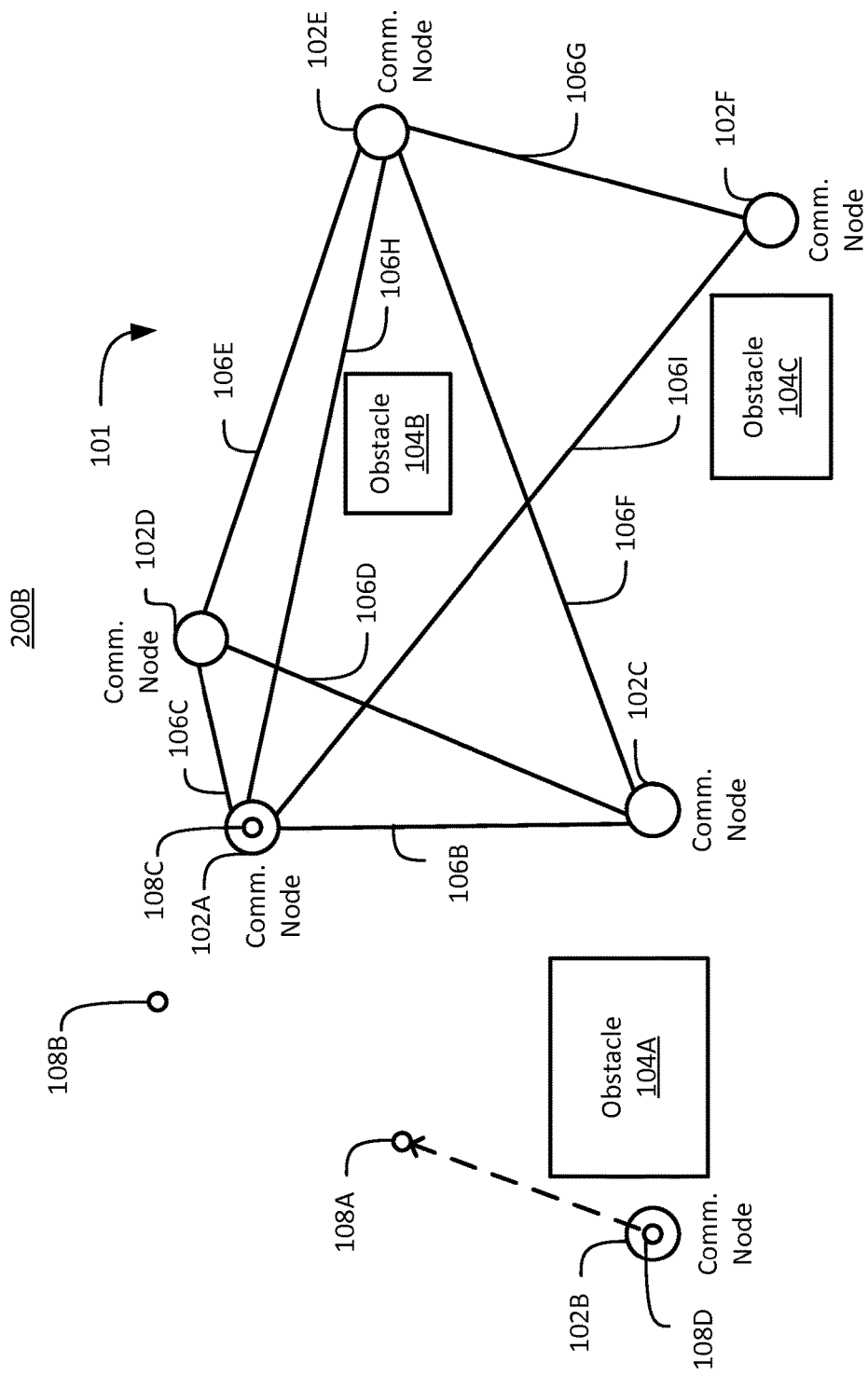
FIG. 2B schematically depicts a second position shift of the group of communication nodes of FIG. 1 in accordance with an embodiment.

FIG. 2B schematically depicts a second position shift 200B of the group 101 of communication nodes 102 in accordance with an embodiment. In FIG. 2B, the communication node 102A has moved from position 108B to position 108C, resulting in a loss of communication link 106A (FIG. 2A) due to obstacle 104A. Both communication nodes 102A and 102B may detect the loss of communication link 106A. Communication node 102A may apply a lower weight to the loss of communication link 106A than a weight applied by communication node 102B, as communication node 102A experienced an improvement in four-fifths of its communication links upon moving to position 108C, while communication node 102B lost its only communication link. Therefore, the burden may be upon communication node 102B to re-establish communication link 106A, if communication node 102B is mobile.

Communication node 102B may have received a path plan from communication node 102A prior to movement of communication node 102A from position 108B to 108C. Thus, communication node 102B may estimate that communication node 102A is at position 108C or traveling between positions 108B and 108C. If communication node 102B has a list of one or more known positions where at least one communication link was previously established in the area of position 108C, that information can be used to create or modify a path plan for communication node 102B. In this example, communication node 102B may know that communication node 102A was previously at positions 108A and 108B. Positions 108A and 108B may be examined as locations of interest for communication node 102B. Using a communication link accessibility map populated with data previously received from communication node 102A, communication node 102B can determine that communication node 102A was able to communicate with communication nodes 102C and 102D at position 108A. A shorter travel path length from the current position of communication node 102B (i.e., position 108D) when selecting between positions 108A and 108B may make position 108A a preferred location to attempt to restore communication link 106A. A path plan of communication node 102B is updated, and a trajectory is determined to navigate communication node 102B from current position 108D based on the update of the path plan of communication node 102B.

Figure 2C:
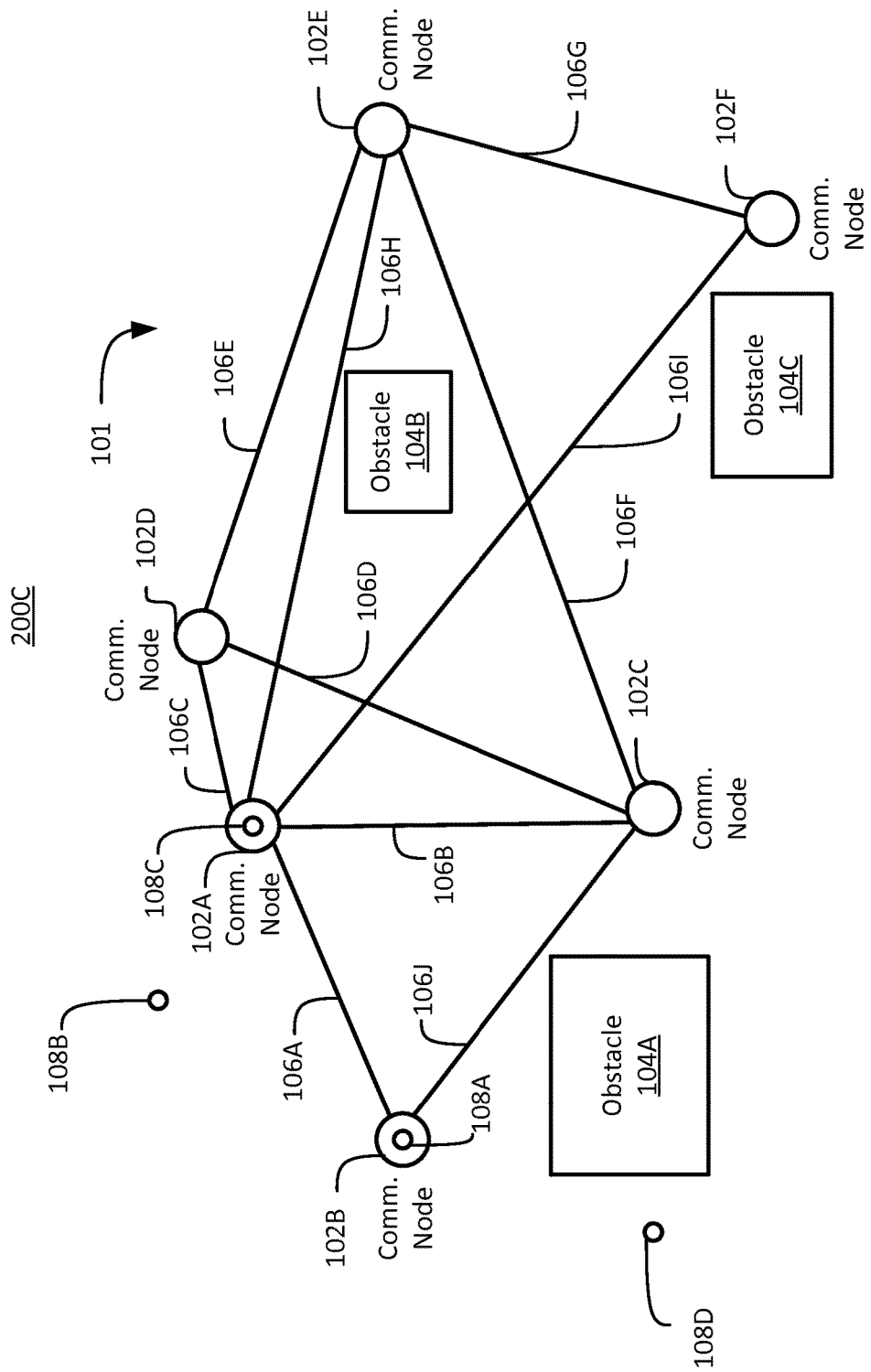
FIG. 2C schematically depicts a third position shift of the group of communication nodes of FIG. 1 in accordance with an embodiment.

FIG. 2C schematically depicts a third position shift 200C of the group 101 of communication nodes 102 in accordance with an embodiment. In FIG. 2C, communication node 102B has navigated from position 108D to position 108A, and the communication link 106A has been reestablished between communication nodes 102A and 102B. Upon moving to position 108A, communication node 102B may also discover that a communication link 106J can be established with communication node 102C, which was previously prevented due to obstacle 104A.

Figure 3:
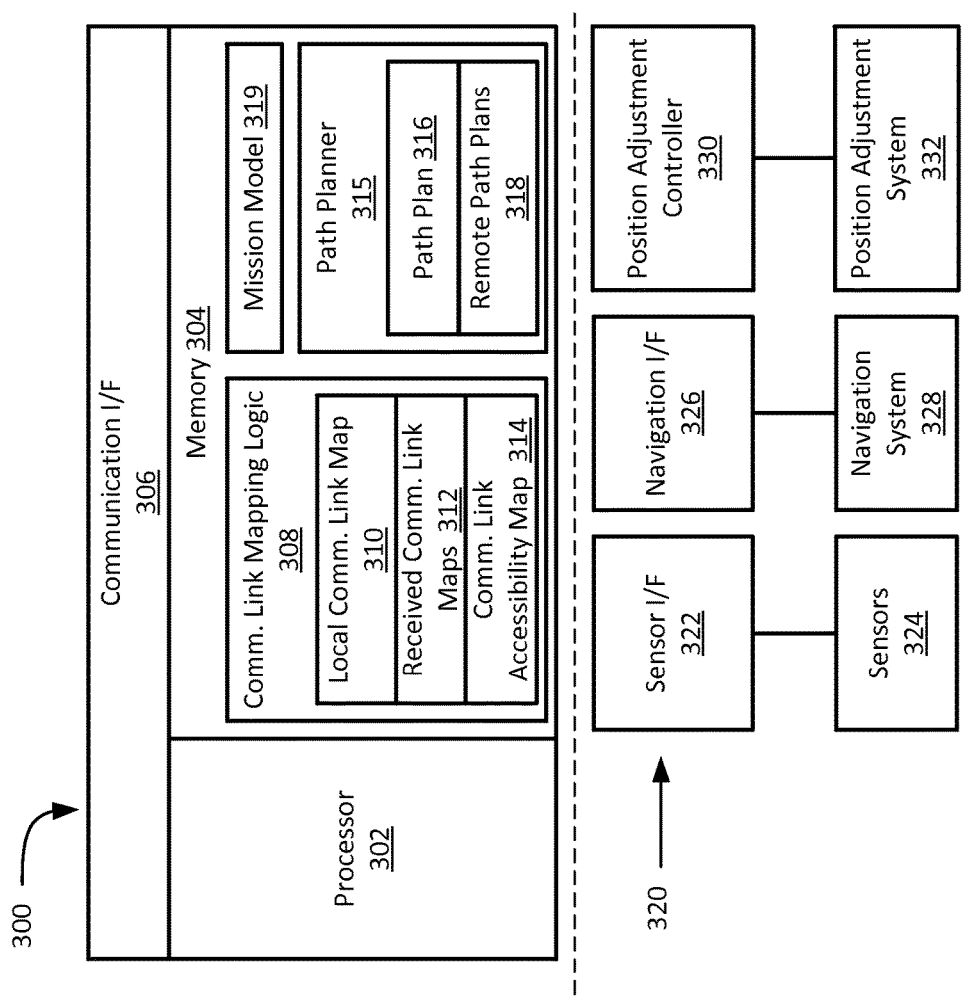
FIG. 3 schematically depicts a block diagram of a communication node for communication link accessibility aware navigation in accordance with embodiments.

FIG. 3 schematically depicts a block diagram of a communication node 300 for communication link accessibility aware navigation in accordance with embodiments. The communication node 300 can be embodied in one or more of the communication nodes 102A-102F of FIGS. 1 and 2A-2C. In some embodiments, at least one of the communication nodes 102A-102F of FIGS. 1 and 2A-2C is an instance of the communication node 300 and one or more of the communication nodes 102A-102F of FIGS. 1 and 2A-2C broadcast signal data but do not perform communication link mapping. In the example of FIG. 3, the communication node 300 includes a processor 302, memory 304, and a communication interface 306. The processor 302 can be any type or combination of computer processors, such as a microprocessor, microcontroller, digital signal processor, application specific integrated circuit, programmable logic device, and/or field programmable gate array. The memory 304 is an example of a non-transitory computer readable storage medium tangibly embodied in the communication node 300 including executable instructions stored therein, for instance, as firmware. Examples of instructions that can be stored in the memory 304 for execution by the processor 302 include communication link mapping logic 308 and a path planner 315.

The communication link mapping logic 308 can generate a local communication link map 310 and may receive one or more communication link maps as received communication link maps 312 from other instances of the communication node 300 via the communication interface 306. The communication link mapping logic 308 can merge the local communication link map 310 and the received communication link maps 312 to form a communication link accessibility map 314. Communication link accessibility data defined in the maps 310-314 can include a variety of location information, link data, and state values, including past, present, and/or estimated values. The maps 310-314 can be formatted in various forms such as a visibility polygon region, a normalized or scaled link characteristic at each latitude-longitude-altitude location of interest, or other position based indexing technique. The maps 310-314 can be defined in three-dimensional space and may include a time dimension as well. Link data can be a vector of communication frequencies, modes, gradients, classifications, and/or various characteristics to define communication type and quality. For directional-based communication protocols, direction information can also be stored in the maps 310-314 for respective communication links. The maps 310-314 can be layered in time to store a "live" version of the values in the maps 310-314 as the most recent (i.e., present) values and past values for gradient calculations, trending, and error checking. The maps 310-314 may also include present state values and estimated state values when considered in conjunction with a path plan 316 of the communication node 300 and remote path plans 318 received from other mobile instances of the communication node 300.

Path plan 316 and remote path plans 318 can define starting locations, target locations, and expected paths of travel between locations. Paths of travel can be defined in three dimensions, including altitude or depth for airborne or submersible instances of the communication node 300. The path plan 316 and remote path plans 318 may also include expected velocities or relative travel times to improve position estimates as instances of the communication node 300 traverse respective paths. The path planner 315 can update the path plan 316 based on anticipated communication link accessibility, remote path plans 318, and a mission model 319 that defines priorities and constraints for making path planning decisions. For non-mobile instances of the communication node 300, the path planner 315 and mission model 319 may be omitted. Alternatively, the communication node 300 may store and relay received remote path plans 318 to other instances of the communication node 300 even if the communication node 300 is non-mobile.

A positioning and sensing subsystem 320 can include a sensor interface 322, a navigation interface 326, and/or a position adjustment controller 330 as part of the communication node 300. In embodiments where the communication node 300 is a fixed position communication station, the positioning and sensing subsystem 320 may be omitted. In embodiments where the communication node 300 is at a fixed position and includes one or more sensors 324, the navigation interface 326 and the position adjustment controller 330 can be omitted. Examples of the sensors 324 can include perception sensors such as one or more video cameras, LIght Detection and Ranging scanners (LIDAR), LAser Detection and Ranging scanners (LADAR), RAdio Detection And Ranging (RADAR), and other sensor types known in the art. For mobile instances of the communication node 300, such as a UAV, ground vehicle, or marine vessel, the navigation interface 326 can receive location data defining a position from a navigation system 328, such as an inertial measurement unit (IMU), global positioning system (GPS), or the like. For mobile instances of the communication node 300, the position adjustment controller 330 can command movements of the communication node 300 using a position adjustment system 332, which may include engine controls, steering controls, flight controls and the like.

Figure 4:
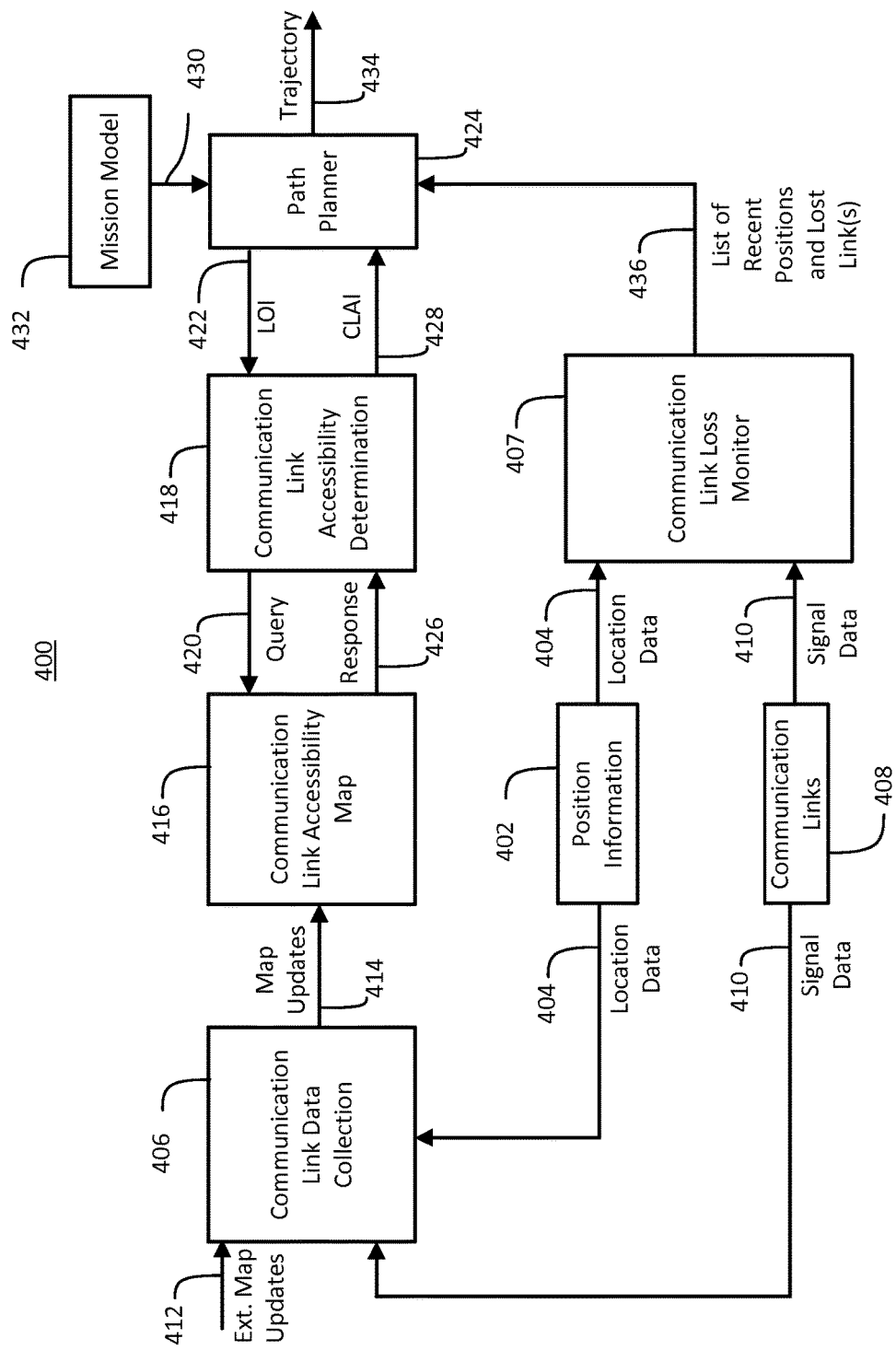
FIG. 4 schematically depicts a block diagram of data flow of communication link accessibility aware navigation in accordance with embodiments.

FIG. 4 schematically depicts a block diagram of data flow 400 of communication link accessibility aware navigation in accordance with embodiments. The data flow 400 can be implemented in the communication node 300 of FIG. 3 and one or more of the communication nodes 102A-102F of FIGS. 1 and 2A-2C. In the data flow 400, position information 402 provides location data 404 to communication link data collection 406 and a communication link loss monitor 407. The position information 402 can be determined by the navigation system 328 of FIG. 3. The position information 402 may be formatted as rotation and acceleration parameters of the communication node 300 of FIG. 3 and converted to a geographic location in the location data 404. Communication links 408 provide signal data 410 to the communication link data collection 406 and the communication link loss monitor 407, for instance, via the communication interface 306 of FIG. 3. Examples of the communication links 408 include the communication links 106A, 106B, and 106C relative to communication node 102A of FIG. 1. The signal data 410 represent the data received on the communication links 408.

The communication link data collection 406 can also receive external map updates 412 such as the received communication link maps 312 of FIG. 3. The communication link mapping logic 308 of FIG. 3 can implement the communication link data collection 406 to identify characteristics of the signal data 410 and apply a location stamp of the position to the characteristics of the signal data 410 based on the location data 404 to produce location stamped signal data in the local communication link map 310 of FIG. 3. In an exemplary embodiment, the communication link data collection 406 monitors signal data 410 of one or more communication links 408 at the communication node 300 of FIG. 3 with respect to the communication node 300 of FIG. 3 and one or more other instances of the communication node 300 of FIG. 3. The communication link data collection 406 can trigger map updates 414 to a communication link accessibility map 416 based on the location stamped signal data and/or external map updates 412, where the communication link accessibility map 416 is an embodiment of the communication link accessibility map 314 of FIG. 3. The communication link data collection 406 can classify each of the communication links 408 based on the characteristics of the signal data 410 and populate the communication link accessibility map 416 with classifications of the one or more communication links 408 as communication link accessibility indicators. The map updates 414 can update the communication link accessibility map 416 based on a change of position of the communication node 300 of FIG. 3 or a change detected in a characteristic of at least one of the one or more communication links 408. The map updates 414 may also include a time stamp for each update of the communication link accessibility map 416.

The communication link accessibility map 416 can be merged with data from one or more maps received from one or more remote sources via external map updates 412. External map updates 412 can include various data values from one or more other instances of the communication node 300 of FIG. 3, such as copies of communication link accessibility maps from one or more other instances of the communication node 300 of FIG. 3. Alternatively, data from a remote source can be an uploaded data file provided during initial configuration or maintenance of the communication node 300 of FIG. 3. Map data provided from a remote source may be a static baseline configuration, observed communication link accessibility map data, and/or estimated communication link accessibility map data.

Communication link accessibility determination 418 can query 420 the communication link accessibility map 416 based on a location of interest 422 provided by a path planner 424 for the communication node 300 of FIG. 3. The path planner 424 is an embodiment of the path planner 315 of FIG. 3. The communication link accessibility determination 418 receives a response 426 from the communication link accessibility map 416, including a communication link accessibility indicator representing a communication link characteristic associated with the location of interest 422 in response to the query 420 of the communication link accessibility map 416. The location of interest 422 may be defined as point, a line, an area, or a volume.

The communication link accessibility determination 418 can parse the response 426 and send the communication link accessibility indicator 428 to the path planner 424. The path planner 424 may receive mission priority and constraint data 430 from a mission model 432, which is an embodiment of the mission model 319 of FIG. 3. The mission priority and constraint data 430 can include various constraints and weightings to apply in planning a path for the communication node 300 of FIG. 3 (e.g., target locations, weighting preferences, known obstacles, vehicle capabilities, and the like). The path planner 424 may determine a communication link accessibility weight based on a mission priority of maintaining a communication link of the communication node 300 of FIG. 3, where the communication link accessibility weight can be provided in the mission priority and constraint data 430. The path planner 424 can apply the communication link accessibility weight to the communication link accessibility indicator 428 in combination with the mission priority and constraint data 430 of the mission model 432 to update a path plan 316 (FIG. 3) of the communication node 300 of FIG. 3. The path planner 424 can determine a trajectory 434 to navigate the communication node 300 of FIG. 3 from a current position based on the update of the path plan 316 of FIG. 3.

The path planner 424 may also receive one or more remote path plans 318 of FIG. 3 from one or more other instances of the communication node 300 of FIG. 3. The path planner 424 can predict a change in position of at least one of the one or more other instances of the communication node 300 of FIG. 3 based on the one or more remote path plans 318 of FIG. 3. The path planner 424 can adjust the trajectory 434 to navigate the communication node 300 of FIG. 3 based on the change in position predicted for at least one of the one or more other instances of the communication node 300 of FIG. 3. For example, upon receiving a remote path plan of the communication node 102A of FIG. 2A indicating a plan to move from position 108B to position 108C, the communication node 102B may adjust its path plan and trajectory towards position 108A as depicted in FIGS. 2B and 2C to maintain or recover communication link 106A.

Various levels of cooperation and collaboration may be achieved between instances of the communication node 300 of FIG. 3, particularly in the context of a collaborative swarm or group, such as group 101 of FIGS. 1 and 2A-2C. As one example, the path plan 316 of FIG. 3, current position, and trajectory 434 of the communication node 300 of FIG. 3 can be shared with one or more other instances of the communication node 300 of FIG. 3 to cooperatively determine a modification of the path plan 316 with the one or more other instances of the communication node 300 to maintain or restore one or more communication links 408. Communication link accessibility estimates for a present state and a future state of the communication node 300 of FIG. 3 can be generated based on the path plan 316 of FIG. 3, the current position, and the trajectory 434 of the communication node 300. The communication link accessibility estimates for the present state and the future state of the communication node 300 can be shared with one or more other instances of the communication node 300. The data sharing can collectively provide a common data set for reference across the group 101 of FIGS. 1 and 2A-2C. Estimates of communication link accessibility can be useful in anticipating where a potential path may lose communication when passing an obstacle and estimating where and when communication can be reestablished.

The communication link loss monitor 407 can monitor for a communication link loss at the communication node 300 of FIG. 3. The communication link loss monitor 407 may provide a list 436 to the path planner 424 of one or more known positions where at least one communication link 408 was previously established to assist in modifying the path plan 316 of FIG. 3 to restore communication. The path planner 424 may determine a cost associated with returning to previous positions and determine whether to modify the trajectory 434 or allow one or more other instances of the communication node 300 to act. The path planner 424 can also consider whether to return to a position where the communication node 300 was previously located or whether to use remotely received data from the communication link accessibility map 416 to target a location where one or more other instances of the communication node 300 had previously achieved communication. The path planner 424 may also access the remote path plans 318 of FIG. 3 to anticipate where one or more other instances of the communication node 300 are likely located upon a loss of communication.

Technical effects include using a communication link accessibility map for navigation and path planning decisions. Communication nodes can exchange communication link accessibility maps that indicate positions where communication links were established along with classifications and/or characteristics associated with the communication links at mapped positions. Communication link accessibility maps can be used to determine where to maneuver a vehicle to maintain a communication link, to anticipate a change in communication link quality, and to anticipate effects of planned movement of other communication nodes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of communication link accessibility aware navigation, the method comprising:
   querying a communication link accessibility map based on a location of interest provided by a path planner for a communication node;
   receiving a communication link accessibility indicator representing a communication link characteristic associated with the location of interest in response to querying the communication link accessibility map;

determining a communication link accessibility weight based on a mission model that defines priorities and constraints for making path planning decision including maintaining a communication link of the communication node;
applying the communication link accessibility weight to the communication link accessibility indicator;
moving the communication node;
monitoring for a communication link loss at the communication node; and
providing a list to the path planner of one or more known positions where at least one communication link was previously established to assist in modifying the path plan to restore communication; and
determining, using the path planner, a cost associated with returning to one or more of the known positions to restore communication.

2. The method of claim 1, further comprising:
monitoring signal data of one or more communication links at the communication node with respect to the communication node and one or more communication nodes;
populating the communication link accessibility map with classifications of the one or more communication links as communication link accessibility indicators; and
updating the communication link accessibility map based on a change of position of the communication node or a change detected in a characteristic of at least one of the one or more communication links.

3. The method of claim 2, wherein applying the communication link accessibility weight to the communication link accessibility indicator is performed in combination with a mission model to update a path plan of the communication node, and further comprising:
determining a trajectory to navigate the communication node from a current position based on the update of the path plan;
receiving one or more remote path plans from the one or more communication nodes; and
predicting a change in position of at least one of the one or more communication nodes based on the one or more remote path plans, one or more known obstacle locations, and present or past values of communication link accessibility data from the communication link accessibility map.

4. The method of claim 3, further comprising:
adjusting the trajectory to navigate the communication node based on the change in position predicted for at least one of the one or more communication nodes.

5. The method of claim 3, further comprising:
sharing the path plan, the current position, and the trajectory of the communication node with the one or more communication nodes; and
cooperatively determining a modification of the path plan with the one or more communication nodes to maintain or restore the one or more communication links.

6. The method of claim 3, further comprising:
generating communication link accessibility estimates for a present state and a future state of the communication node based on the path plan, the current position, the trajectory of the communication node, the one or more known obstacle locations, and present or past values of the communication link accessibility data from the communication link accessibility map; and
sharing communication link accessibility estimates for the present state and the future state of the communication node with the one or more communication nodes.

7. The method of claim 1, wherein the communication link accessibility map further comprises a time stamp for each update of the communication link accessibility map.

8. The method of claim 1, further comprising merging the communication link accessibility map with data from one or more maps received from one or more remote sources.

9. The method of claim 1, wherein the communication node is an unmanned aerial vehicle.

10. A communication node for communication link accessibility aware navigation, the communication node comprising:
a processor; and
memory having instructions stored thereon that, when executed by the processor, cause the communication node to:
query a communication link accessibility map based on a location of interest provided by a path planner for the communication node;
receive a communication link accessibility indicator representing a communication link characteristic associated with the location of interest in response to the query of the communication link accessibility map;
determine a communication link accessibility weight based on a mission model that defines priorities and constraints for making path planning decision including maintaining a communication link of the communication node;
apply the communication link accessibility weight to the communication link accessibility indicator;
move the communication node;
monitor for a communication link loss at the communication node; and
provide a list to the path planner of one or more known positions where at least one communication link was previously established to assist in modifying the path plan to restore communication; and
determine, using the path planner, a cost associated with returning to one or more of the known positions to restore communication.

11. The communication node of claim 10, wherein the instructions further cause the communication node to:
monitor signal data of one or more communication links at the communication node with respect to the communication node and one or more communication nodes;
populate the communication link accessibility map with classifications of the one or more communication links as communication link accessibility indicators; and
update the communication link accessibility map based on a change of position of the communication node or a change detected in a characteristic of at least one of the one or more communication links.

12. The communication node of claim 11, wherein the communication link accessibility weight is applied to the communication link accessibility indicator in combination with a mission model to update a path plan of the communication node, and the instructions further cause the communication node to:
determine a trajectory to navigate the communication node from a current position based on the update of the path plan;
receive one or more remote path plans from the one or more communication nodes;
predict a change in position of at least one of the one or more communication nodes based on the one or more remote path plans, one or more known obstacle locations, and present or past values of communication link accessibility data from the communication link accessibility map; and adjust the trajectory to navigate the communication node based on the change in position predicted for at least one of the one or more communication nodes.

13. The communication node of claim 12, wherein the instructions further cause the communication node to:

generate communication link accessibility estimates for a present state and a future state of the communication node based on the path plan, the current position, the trajectory of the communication node and the one or more known obstacle locations, and present or past values of the communication link accessibility data from the communication link accessibility map;

share communication link accessibility estimates for the present state and the future state of the communication node with the one or more communication nodes;

share the path plan, the current position, and the trajectory of the communication node with the one or more communication nodes; and cooperatively determine a modification of the path plan with the one or more communication nodes to maintain or restore the one or more communication links.

* * * * *